Jan. 23, 1945.  M. J. BROWN  2,367,925
POWER LINE SYNCHRONIZING AND CONTROL SYSTEM
Filed May 15, 1942  2 Sheets-Sheet 2
Fig. 3.
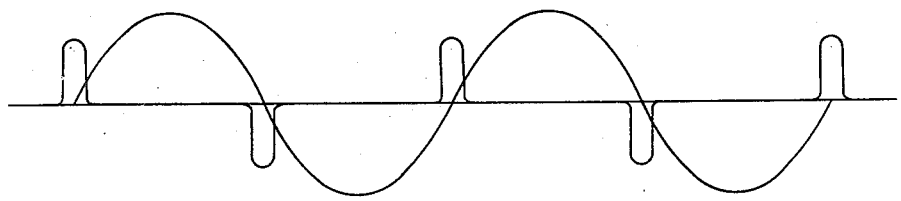
Fig. 4.
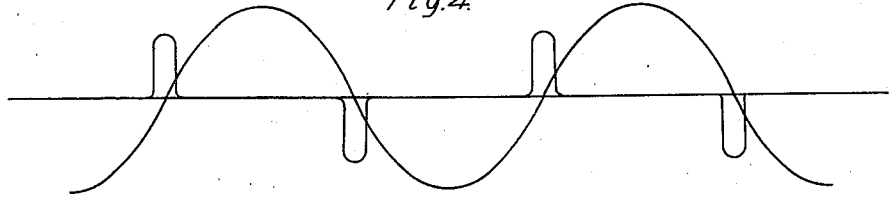
Fig. 5.   Fig. 6.   Fig. 7.   Fig. 8.
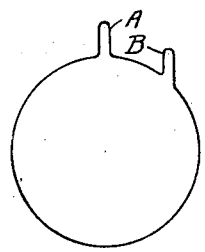 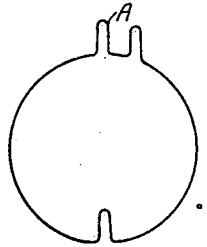 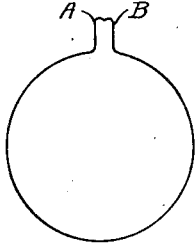 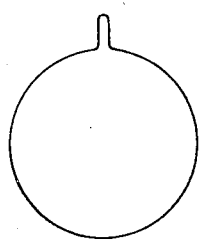
Fig. 9.   Fig. 10.   Fig. 11.   Fig. 12.
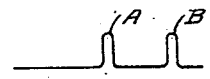  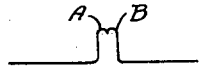 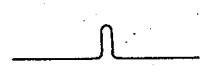
WITNESSES:
INVENTOR
Myron J. Brown.
BY
ATTORNEY Patented Jan. 23, 1945

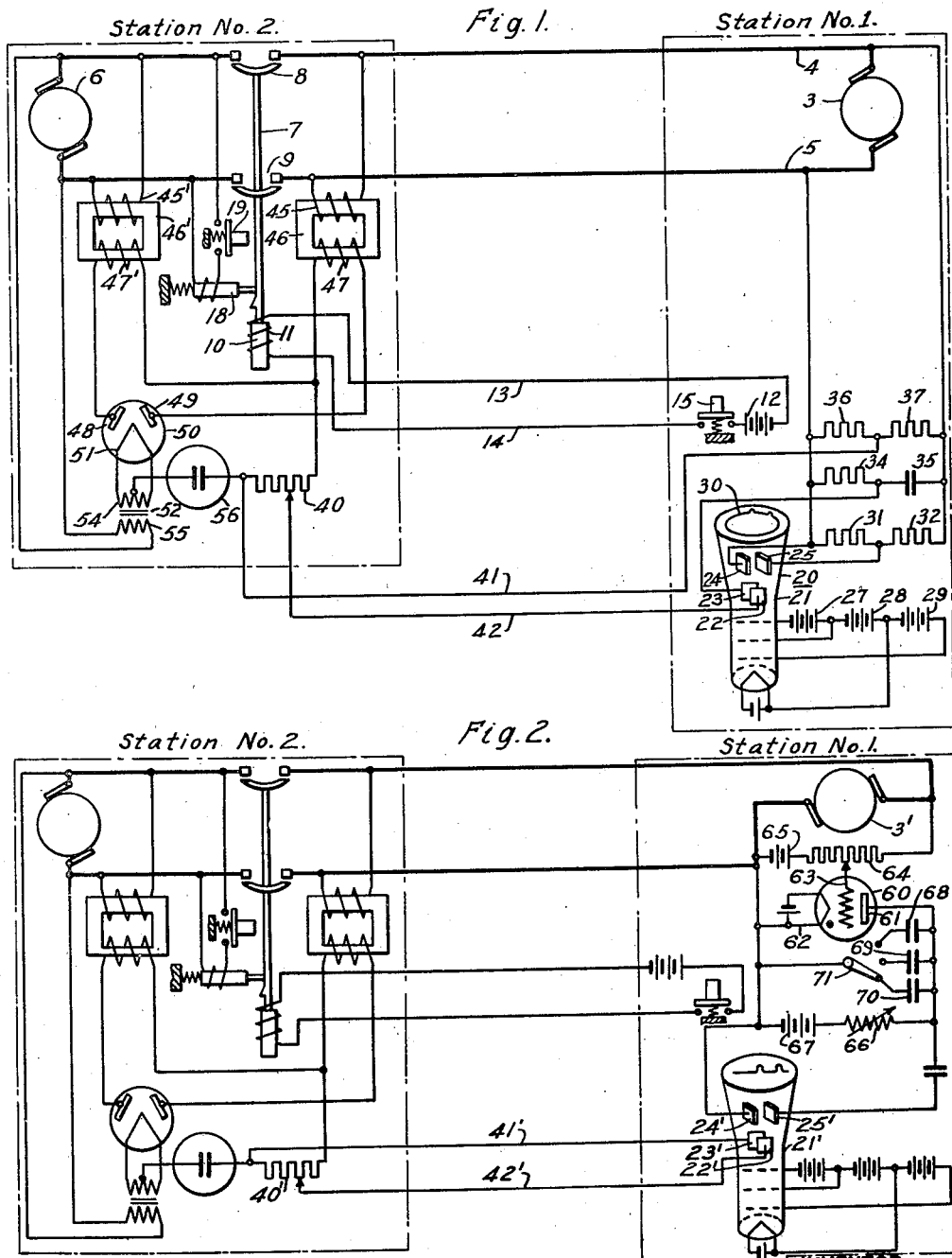

2,367,925

UNITED STATES PATENT OFFICE 2,367,925

POWER LINE SYNCHRONIZING AND CONTROL SYSTEM

Myron J. Brown, Forest Hills, Pa., assignor to Westinghouse Electric & Manufacturing Company, East Pittsburgh, Pa., a corporation of Pennsylvania Application May 15, 1942, Serial No. 443,056

2 Claims. (Cl. 172—245)

This invention relates to electrical power distribution systems and, more particularly, to control circuits for operating such systems from central points.

A primary object of the invention is to simplify the control of power distribution between two or more stations where each is called upon to supply power to a common load circuit, in that it provides accurate information of the current-phase relation between such stations.

Another object of the invention is to utilize a cathode-ray type indicator at the control point to show the phase angle displacement of the alternating-current power line of one station with reference to the current supplied from another station.

A particular advantage of the invention is that exact synchronization between the currents of two generating stations may be obtained at the time it is desired to connect one of the stations to the load line of the other station.

Other objects and advantages will be apparent from the following description of the invention, pointed out in particularity in the appended claims, and taken in connection with the accompanying drawings, in which:

Figure 1 shows a schematic circuit arrangement of the phase indicating system between two generating stations;

Fig. 2 is a modification of the system shown in Fig. 1 as to the character of the observable indication;

Figs. 3 and 4 show, by means of curves, the synchronizing pulses obtained from two generating stations;

Figs. 5 to 8 show various phases of the oscilloscope pattern used in connection with the synchronizing system of Fig. 1; and Figs. 9 to 12 show similar phases of the oscilloscope pattern obtained from the arrangement shown in Fig. 2.

Referring to the figures, in Fig. 1, the two generating stations are indicated by the enclosures formed by dot-and-dash lines. Station No. 1 includes the power generator 3, to which is connected a power line comprising conductors 4 and 5. This line may cover a large territory supplying power to different types of loads (not shown). The present invention is not concerned with the distribution of power to the various loads, but mainly with the distribution of power between two generating stations, particularly with the control of the connection of one generating station to the power line of another generating station. The line 4 and 5 extends to the second generating station where there is a similar generator 6. The power line is interrupted by the circuit breaker 7 having a pair of contacts 8 and 9 breaking or closing the circuit of conductors 4 and 5, respectively. The actuation of the circuit breaker 7 is obtained by the electromagnet 10, the winding 11 of which is connected to a source 12 located at station No. 1. A control line, comprising conductors 13 and 14, connects the two stations, a switch 15 being interposed in said line at station No. 1 for the remote control of the circuit breaker 7. A release relay 18 is supplied with energy from the output of the generator 6, and is controlled by the switch 19 at station No. 2.

The control line 13 and 14 herein shown indicates merely a control circuit between the two stations. As far as the operation of this invention is concerned, it is not necessary that this line be a separate line comprising metallic conductors. In practice, a control line may be a carrier-current channel superimposed on the power line, or a radio frequency transmission circuit may be employed. For the sake of simplicity in the illustration, the supervisory communication channel is represented here by the two conductors 13 and 14.

If it is desired to connect station No. 2 to the power line of station No. 1 when, for example, the demand for power is such that station No. 1 cannot supply it alone, the operator at station No. 1 may effect the closure of the circuit breaker 7 by actuating the switch 15. To do so, however, in an alternating-current system, it is essential that the currents generated at both stations should be of the same frequency and also in phase. When such condition is established, the closure of the circuit breaker 7 may be effected. Should the power line be connected to the second station at a time when the two currents are not in phase, considerable power will be absorbed between the two generators and may result even in serious damage to one. It is, therefore, of primary importance that the operator controlling the two stations from one point (herein shown at station No. 1) shall be fully informed of the current phase relation between the two generators.

At the control station (herein shown as control station No. 1), there is provided a cathode ray oscilloscope 20 comprising the cathode ray tube 21 having ray deflecting plates 22 and 23 for the vertical deflection, and similar plates 24 and 25 for the horizontal deflection of the cathode rays. Tubes of this type are widely used in the electrical art, and their operation is well understood. How the cathode rays are formed need not be described in detail, suffice it to say that the various electrodes of the cathode ray tube 21 are shown here being connected to suitable power supplies indicated by the batteries 27, 28 and 29. The cathode ray tube 21 is shown in semi-perspective so that the pattern in the form of a circular trace 30 may be indicated at the end thereof. The latter is formed in such manner that a voltage is applied between the deflector plates 24 and 25 from the voltage drop across the resistor 31, which, in series with the resistor 32, connects directly to the power line conductors 4 and 5. The other set of deflecting plates 22 and 23 are supplied with a voltage derived from the series-parallel network comprising resistors 34, 36 and 37 and condenser 35 connected across the lines 4 and 5. The voltage between the junction points of the network elements will be 90° out of phase with the voltage across the resistor 31, because of the capacitor 35 in the circuit. Voltages so applied to the deflector plates of the cathode ray tube will produce a circular pattern.

It is seen that the circuit for applying the voltage to the deflecting plates 22 and 23 is not completed to the source, namely to the junction point between resistors 36 and 37 and resistors 34 and condenser 35. The circuit is completed through the resistor 40 which forms a portion of a circuit located at station No. 2. Conductors 41 and 42 are shown as a line between the two stations. As formerly stated in connection with the lines 13 and 14, it is not necessary that these lines form wires between the two stations. When larger distances are to be covered, instead of wire connecting links, wireless links may be used in the form of carrier current superposed on the power line. In the latter case, the potential applied to the lines 41 and 42 from the resistor 40 may be transmitted as modulations of a carrier wave and transformed into suitable pulses from a receiving circuit located at station No. 1.

At station No. 2, the power line terminating at one end of the circuit breaker supplies voltage to the primary winding 45 of a transformer 46. Similarly, the power line at the other side of the circuit breaker supplies voltage to the primary winding 45' of a transformer 46'. These transformers are of the saturating type known as impulse transformers which operate on the peak value of the voltage wave appearing on the power line 4 and 5. As long as the circuit breaker 7 is open, transformer 46 is supplied with current from the generator 3, whereas transformer 46' from the generator 6. The secondary winding 47 of the transformer 46 and the secondary winding 47' of the transformer 46' are connected in series between anodes 48 and 49 of the rectifier tube 50. The cathode 51 may be energized from the generator 6 through the transformer 52. The connection to the cathode is effected at the center tap 53 of the secondary winding 54 of the heater supply transformer 55. The rectifier output is taken from the junction point of the windings 47 and 47' and the center tap 53 of the heater transformer 55. Between these points are connected the glow discharge tube 56 and the resistor 40 previously mentioned.

Prior to describing the operation of the system, reference should be had to Fig. 2, in which identical component elements of the control system of Fig. 1 are indicated by similar reference characters bearing primary indices. The difference in the circuit shown in Fig. 2 consists only in the deflective voltage supplied to the cathode ray oscilloscope. Instead of the circular trace utilized in the system shown in Fig. 1, a linear time axis is provided by a conventional saw-tooth generator sweep circuit. The vacuum tube 60 functions as an oscillator of saw-tooth wave form in that its anode 61 is connected to a resistance-capacity combination comprising the load resistor 66 which may be shunted selectively with one of a plurality of condensers 68, 69 and 70 by means of the switch 71. In series with the load resistance and connected to the cathode 62 is the anode voltage source represented here by the battery 67. The sweep voltage produced by the oscillator is synchronized with the frequency of the generator 3' in that the grid 63 connects to a potentiometer 64 connected across terminals of the generator 3' in series with a source shown here by the battery 65. The particular type of tube suitable for this service contains an inert gas. That the tube is of the gas type is indicated by the dot placed within the tube envelope near the cathode.

The time constant provided by the value of the load resistor and the respective capacitor in shunt therewith determines the frequency of oscillations produced by the tube 60 in the form of a saw-tooth voltage synchronized by means of the grid connection with the frequency of the generator at station No. 1. The output voltage of the tube 60 is connected to the horizontal deflecting plates 24' and 25' of the cathode ray oscilloscope 21'. In this manner, instead of a circular pattern, a linear sweep will be effected along the horizontal deflection of the cathode ray beam. The vertical deflecting plates 22' and 23' are connected directly by means of conductors 41' and 42' representing the control channel to the resistor 40' located in the control circuit at station No. 2. This circuit is identical with the one formerly described and need not be repeated here.

Referring to the operation of the system, let us consider first the function of the control circuit at station No. 2. Taking either Fig. 1 or Fig. 2 in following the circuit, it is seen that transformers 46 and 46' are energized by currents derived from the line supplied by generator 3 and generator 6, respectively. The secondary windings being in series will supply a voltage wave at each half cycle of peak voltages in the respective circuits. When these voltage impulses are rectified, there will appear a unidirectional voltage proportional to the peak magnitudes across the elements of the gaseous discharge tube 56. When a flashover occurs, current will flow in the resistor 40, producing a voltage impulse which is transmitted over the line 41 and 42 to the vertical deflecting plates 22 and 23 in series with the vertical deflecting component derived from the phase-shift network comprising resistors 34, 36 and 37 and condenser 35. The impulses will modulate the pattern 30 in such manner that the circular line will be extended. The component derived from the transformer 46 will always be in phase with the power line current, since the transformer is supplied therefrom. Consequently, it will be in time phase relation also with the deflection component resulting in a radial extension of the pattern at one point. This extension remains stationary. The other impulse derived from the generator 6 by means of the transformer 46' on the other hand will vary in phase relation as long as the generator 6 is not synchronized, that is, as long as it produces a voltage out of phase with the voltage of the generator 3. The modulation of the pattern effected by this impulse will be placed along the circular pattern at a distance from the other deflection determined by the phase angle difference between the two currents.

Referring now to Figs. 3 and 4, a clear understanding will be had if we compare the two voltage waves, one from the generator 3 shown in Fig. 3 and the other from the generator 6 shown in Fig. 4. These are shown here as being displaced 90°. In Fig. 3, the voltage pulse derived from the transformer 46 is shown occurring whenever the voltage wave of generator 3 reaches its peak value, giving an impulse for each half cycle. The voltage pulse resulting from the peak values represented by the voltage of the generator 6 shown in Fig. 3 will produce, due to transformer 46', a voltage pulse for each half cycle of its peak value. When these voltage pulses are combined in the rectifier, each voltage pulse will produce a unidirectional voltage which, as stated before, is applied to the deflecting plates 22 and 23.

Figs. 5, 6, 7 and 8 show the characteristic modification of the circular pattern. In Fig. 5, the radial deflection A represents the voltage pulse derived from the generator line voltage 3, which is stationary, in that it will be always synchronized with the deflection. The pulse B shown in Fig. 5 represents approximately a 45° phase-shift, and it will remain in this position until the generator 6 changes its speed to attain substantially the same time-phase relation in voltage of the feed line of generator 3. A 180° phase-shift is shown in Fig. 6. The deflection B here is inverted and is in line with that of A. An approach to synchronism is shown in Fig. 7, where the two deflections A and B are practically superposed, indicating only a few degrees of phase-shift. Fig. 8 shows no second deflection in that both pulses arrive in phase, and the deflections are perfectly superposed. This condition indicates that synchronism has been obtained, and the operator at station No. 1 may now connect generator 6 to the common supply circuit by pressing the switch 15 thereby closing the circuit breaker 7.

Figs. 9, 10, 11 and 12 show the pattern obtained in accordance with the system described in connection with Fig. 2. Instead of a circular pattern, a horizontal line is deflected in accordance with the voltage pulses received. Pulse A remains stationary, since the occurrence of the saw-tooth sweep voltage is in synchronism with the frequency of the generator 31 by virtue of the grid excitation derived therefrom. Deflection B will be separated from A in accordance with the magnitude of phase-shift between the two generator voltages. Fig. 9 shows a 45° phase-shift. Fig. 10 indicates the conditions where there is an approach to synchronism in that the distance between deflections A and B is smaller. Fig. 11 shows progressively a very close approach to synchronism, indicating only a few degrees of phase-shift, whereas Fig. 12 illustrates the same condition as Fig. 8 in that the two deflections A and B are now perfectly superposed.

I claim as my invention:

1. In an alternating-current power distribution system, a first generating station and a second generating station, a power line interconnecting said stations, means for communicating between said stations, means energized from said means including a cathode ray oscilloscope and means for deflecting the cathode rays of said oscilloscope in a predetermined pattern at a rate determined by the frequency of said first station, and means for deflecting said deflecting means producing said pattern at peak values of currents derived from both said generating stations resulting in an observable change of said pattern, said change being indicative of the degree of phase displacement between said currents.

2. In an alternating-current power distribution system, a first generating station and a second generating station, a power line interconnecting said stations, means for communicating between said stations, means energized from said means including a cathode ray oscilloscope and means for deflecting the cathode rays of said oscilloscope in a circular pattern at a rate determined by the frequency of said first station, and means for modulating said deflecting means producing said pattern at peak values of current derived from both said generating stations resulting in radial extensions of a portion of said circular pattern, the displacement of said extensions being indicative of the degree of phase displacement between said currents.

MYRON J. BROWN.